(12) United States Patent (10) Patent No.: US 8,114,515 B2
Hein et al. (45) Date of Patent: Feb. 14, 2012

(54) CROSSLINKED POLYESTER COMPOSITIONS, METHOD OF MANUFACTURE, AND USES THEREOF

(75) Inventors: Christopher Luke Hein, Evansville, IN (US); Ganesh Kannan, Evansville, IN (US); Sreepadaraj Karanam, Brabant (NL); Claire Qing Yu, Chicago, IL (US)

(73) Assignee: Sabic Innovative Plastics IP B.V. (NL)

( * ) Notice: Subject to any disclaimer, the term of this patent is extended or adjusted under 35 U.S.C. 154(b) by 416 days.

(21) Appl. No.: 11/671,278

(22) Filed: Feb. 5, 2007

(65) Prior Publication Data

US 2008/0185558 A1   Aug. 7, 2008

(51) Int. Cl.
*B32B 5/16* (2006.01)
(52) U.S. Cl. .......... 428/402; 524/81; 524/601; 525/437; 525/444; 525/446; 525/449
(58) Field of Classification Search .................. 525/437, 525/438, 449, 444, 446; 428/402; 524/81, 524/601
See application file for complete search history.

(56) References Cited

U.S. PATENT DOCUMENTS

| | | | |
|---|---|---|---|
| 2,465,319 A | 3/1949 | Whinfield et al. | |
| 3,047,539 A | 7/1962 | Pengilly | |
| 3,723,568 A | 3/1973 | Hoeschele | |
| 3,799,799 A | 3/1974 | Woodhams et al. | |
| 4,191,714 A | 3/1980 | Kazuya et al. | |
| 4,213,886 A | 7/1980 | Turner | |
| 4,632,869 A * | 12/1986 | Park et al. | 428/315.5 |
| 4,647,630 A | 3/1987 | Schmid et al. | |
| 4,801,658 A | 1/1989 | Furukawa et al. | |
| 5,055,249 A | 10/1991 | Schmid | |
| 5,102,941 A | 4/1992 | Yamamoto et al. | |
| 5,179,144 A | 1/1993 | Yamamoto et al. | |
| 5,232,773 A * | 8/1993 | Itoh et al. | 428/313.5 |
| 5,573,909 A | 11/1996 | Singer et al. | |
| 5,736,251 A | 4/1998 | Pinchuk | |
| 5,766,277 A * | 6/1998 | DeVoe et al. | 51/295 |
| 6,312,782 B1 | 11/2001 | Goldberg et al. | |
| 6,514,617 B1 | 2/2003 | Hubbard et al. | |
| 6,984,694 B2 | 1/2006 | Blasius, Jr. et al. | |
| 2003/0132538 A1 | 7/2003 | Chandler | |
| 2004/0146641 A1 | 7/2004 | Hobbs et al. | |
| 2005/0112768 A1 | 5/2005 | Evans et al. | |
| 2007/0213471 A1* | 9/2007 | Kim et al. | 525/437 |
| 2007/0213473 A1* | 9/2007 | Yu et al. | 525/446 |
| 2008/0161483 A1* | 7/2008 | Kind | 524/556 |

FOREIGN PATENT DOCUMENTS

| | | | |
|---|---|---|---|
| EP | 0273149 A2 | | 7/1988 |
| EP | 0273149 A3 | | 7/1988 |
| EP | 0 334 620 | * | 9/1989 |
| EP | 0757079 A1 | | 2/1997 |
| EP | 0651005 B1 | | 3/2000 |
| EP | 1324784 B1 | | 8/2005 |
| GB | 2012292 A1 | | 7/1979 |
| WO | 9855550 A1 | | 12/1998 |
| WO | 2006041658 A1 | | 4/2006 |
| WO | 2007103007 A2 | | 9/2007 |
| WO | 2007103007 A3 | | 9/2007 |

OTHER PUBLICATIONS

Sheet 1, Silquest Y-11597 Silane product data sheet, 2003 [online], accessed via the Internet [retrieved on Sep. 1, 2009], URL: <http://www.momentive.com/momentiveInternetDoc/MPM/Static%20Files/Documents/Data%20Sheets/Silquest%20Y-11597%20MB.indd.pdf>.*
Kulshreshtha, B.; Ghosh, A.K.; Misra, A.; Polymer, vol. 44, p. 4723-4734, 2003 [online], accessed via the Internet [retrieved on Sep. 2, 2009], URL: <http://www.sciencedirect.com/science?_ob=ArticleURL&_udi=B6TXW-48VTG5S-2&_user=2502287&_rdoc=1&_fmt=&_orig=search&_sort=d&_docanchor=&view=c&_searchStrId=998590828&_rerunOrigin=google&_acct=C000055109&>.*
Sheet 1, CoatOSil 1770 Product Data Sheet, Momentive Performance Materials, 2003.*
Blank, W.; He, Z.A.; Picci, M.; Catalysis of the Epoxy-Carboxyl Reaction, 2003, p. 1-18.*
Callari, James J.; Micropellets: Little things mean a lot; Plastics World, Nov. 1994, p. 20-22.*
Crompton; Silquest® Silanes: Products and Applications, p. 1-8, 2003.*
JP 63-063767; Dated Mar. 22, 1988 (translation of abstract only).
XP-002481031—JP Application No. 2002-153782.
XP-002481030—JP Application No. 2003-342522.
European Patent Office, PCT International Search Report, International Application No. PCT/US2008/053003, Date of Mailing: Oct. 13, 2008.
European Patent Office, PCT Written Opinion of the ISA, International Application No. PCT/US2008/053003, Date of Mailing: Oct. 13, 2008.
EP Application No. 05254761.9-1214; Search Report dated Oct. 11, 2006.

* cited by examiner

*Primary Examiner* — David W Wu
*Assistant Examiner* — Robert Jones, Jr.
(74) *Attorney, Agent, or Firm* — Cantor Colburn LLP; Diderico van Eyl

(57) ABSTRACT

A composition comprises a thermally crosslinked reaction product of a polyester and a carboxy-reactive material. Methods for the manufacture of the composition and articles derived from the composition are also disclosed.

44 Claims, No Drawings

CROSSLINKED POLYESTER COMPOSITIONS, METHOD OF MANUFACTURE, AND USES THEREOF

BACKGROUND OF THE INVENTION

This disclosure relates to polyester compositions, in particular crosslinked polyester compositions, their methods of manufacture and uses.

Polyesters, copolyesters, and their blends with other thermoplastics have a number of advantageous properties, including high mechanical strength and good processability, which make them useful in a wide variety of applications. Nonetheless, there remains a continuing need in the art for methods for adjusting specific properties of polyesters, such as their thermal resistance, chemical resistance, flame retardance, and the like.

One method of altering polyester properties is by crosslinking, for example by irradiation of the polyester. Irradiation crosslinking has limitations due to cost and availability. In addition, irradiation is affected by, or could interfere with, additives such as dyes, pigments, and antioxidants. Chemical crosslinking using a crosslinking agent such as a multifunctional acrylate or multifunctional epoxy resin in the presence of an initiator such as a peroxide and a tertiary amine accelerator has also been used. However, these processes are heat sensitive and difficult to control, which can lead to inconsistent results or unwanted side effects during processing of the polyester, for example extrusion.

There accordingly remains a need in the art for methods for crosslinking polyesters and the crosslinked polyesters formed thereby. It would be advantageous if such methods were predictable, and readily adaptable to large scale manufacture. It would further be advantageous if the methods were controllable, such that adjustment of the crosslinking conditions allowed tailoring of the properties of the crosslinked polyester.

BRIEF DESCRIPTION OF THE INVENTION

The invention relates to a composition comprising the thermally crosslinked reaction product of a polyester and a carboxy-reactive material.

In an embodiment, a composition comprises the thermally crosslinked reaction product of a poly(ethylene terephthalate), poly(1,4-butylene terephthalate), poly(ethylene naphthalate), poly(butylene naphthalate), (polytrimethylene terephthalate), poly(1,4-cyclohexylenedimethylene 1,4-cyclohexanedicarboxylate), poly(1,4-cyclohexylenedimethylene terephthalate), poly(cyclohexylenedimethylene-co-ethylene terephthalate), poly(butylene-co-poly(oxytetramethylene) terephthalate), poly(butylene-co-poly(oxyethylene) terephthalate), or a combination comprising at least one of the foregoing; and a compound comprising an epoxy group, a compound comprising an epoxy group and a silane group, a copolymer comprising units derived from the reaction of an ethylenically unsaturated compound and glycidyl (meth)acrylate, a terpolymer comprising units derived from the reaction of two different ethylenically unsaturated compounds and glycidyl (meth)acrylate, a styrene-(meth)acrylic copolymer containing a glycidyl group incorporated as a side chain, an oligomer containing a glycidyl group incorporated as a side chain, a diglycidyl ether of bisphenol A, a novolac epoxy resin, a phenolic epoxy polymer, or a combination comprising at least one of the foregoing materials.

In another embodiment, a composition comprises a thermally crosslinked reaction product of a poly(1,4-butylene terephthalate), and beta-(3,4-epoxycyclohexyl)ethyl triethoxysilane.

A method of forming a thermally crosslinked polyester composition comprises thermally crosslinking a polyester and a carboxy-reactive material.

In another embodiment, a composition comprises from 0.0005 to 20 weight percent of a visual effect additive; and from 80 to 99.9995 weight percent of the thermally crosslinked reaction product of a polyester and a carboxy-reactive material, each based on the combined weight of the visual effect additive and the thermally crosslinked reaction product, wherein the reaction product at least partially encapsulates the visual effect additive.

In another embodiment, a method for the manufacture of a visual effect additive composition comprises at least partially encapsulating 0.0005 to 20 weight percent of a visual effect additive with 80 to 99.9995 weight percent of the thermally crosslinked reaction product of a polyester and a carboxy-reactive material, each based on the combined weight of the visual effect additive and the reaction product.

Another aspect of the present disclosure relates to an article comprising the above-described compositions.

Various other features, aspects, and advantages of the present invention will become more apparent with reference to the following description, examples, and appended claims.

DETAILED DESCRIPTION OF THE INVENTION

The present inventors have discovered that polyesters can be effectively crosslinked when polyester is contacted with a carboxy-reactive compound, and heated. A wide variety of carboxy-reactive compounds can be used, for example, compounds where an epoxy group is attached to a terminal cycloaliphatic ring. The method is efficient, and readily scalable for industrial production. Thermally crosslinked polyester-carboxy-reactive materials can be a useful additive to make polyester-based compositions and articles that increase the haze or reduce the clarity of the article, which are important properties in some applications. In one embodiment, when a thermally crosslinked polyester-carboxy-reactive material is used in conjunction with a visual effect additive, the resulting thermally crosslinked material can be useful as an additive in making polyester compositions and polyester articles where it is important to achieve decorative patterns or as a taggant for security applications.

The singular forms "a," "an," and "the" include plural referents unless the context clearly dictates otherwise. The terms "first," "second," and the like herein do not denote any order, quantity or importance, but rather are used to distinguish one element from another. As used herein, the "(meth)acryl" prefix includes both the methacryl and acryl. "Optional" or "optionally" means that the subsequently described event or circumstance may or may not occur, and that the description includes instances where the event occurs and instances where is does not. Unless defined otherwise, technical and scientific terms used herein have the same meaning as is commonly understood by one of skill. Compounds are described using standard nomenclature.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations. The endpoints of all ranges directed to the same component or property are inclusive of the endpoint and independently combinable.

A wide variety of polyesters can be crosslinked using the methods described herein, including both crystalline and amorphous polyesters having repeating structural units of formula (I)

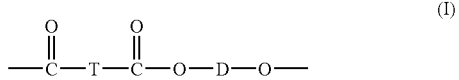

wherein each T is independently a divalent $C_{2-20}$ aliphatic group, $C_{5-20}$ cycloaliphatic group, or $C_{6-20}$ aromatic group derived from a dicarboxylic acid or a chemical equivalent thereof; and each D is independently a divalent $C_{2-20}$ alkylene group, $C_{6-20}$ alicyclic group, $C_{6-20}$ aromatic group, or poly($C_{2-6}$ oxyalkylene) group derived from a dihydroxy compound or a chemical equivalent thereof. Copolyesters containing a combination of different T and/or D groups can be used. Chemical equivalents of diacids include the corresponding esters, alkyl esters, e.g., $C_{1-3}$ dialkyl esters, diaryl esters, anhydrides, salts, acid chlorides, acid bromides, and the like. Chemical equivalents of dihydroxy compounds include the corresponding esters, such as $C_{1-3}$ dialkyl esters, diaryl esters, and the like. The polyesters can be branched or linear.

Examples of $C_{6-20}$ aromatic dicarboxylic acids that can be used to prepare the polyesters include isophthalic acid, terephthalic acid, 1,2-di(p-carboxyphenyl)ethane, 4,4'-dicarboxydiphenyl ether, 4,4'-bisbenzoic acid, and the like, and 1,4- or 1,5-naphthalene dicarboxylic acids and the like. A combination of isophthalic acid and terephthalic acid can be used, wherein the weight ratio of isophthalic acid to terephthalic acid is 91:9 to 2:98, specifically 25:75 to 2:98. Exemplary $C_{5-20}$ cycloaliphatic dicarboxylic acids contain at least one cycloaliphatic moiety and include monocyclo- and bicyclo-aliphatic acids such as decahydronaphthalene dicarboxylic acids, norbornene dicarboxylic acids, bicyclooctane dicarboxylic acids, 1,4-cyclohexanedicarboxylic acid (both cis and trans), specifically trans-1,4-cyclohexanedicarboxylic acid, 1,4-hexylenedicarboxylic acid, and the like. Aliphatic $C_{2-20}$ dicarboxylic acids such as adipic acid, azelaic acid, dicarboxyl dodecanoic acid, and succinic acid can also be useful.

Exemplary diols useful in the preparation of the polyesters include aliphatic diols such as ethylene glycol, 1,2-propylene glycol, 1,3-propylene glycol, 2,2-dimethyl-1,3-propane diol, 2-ethyl-2-methyl-1,3-propane diol, 1,4-butane diol, 1,4-but-2-ene diol, 1,3-1,5-pentane diol, 1,5-pentane diol, dipropylene glycol, 2-methyl-1,5-pentane diol, and the like. Exemplary cycloaliphatic diols include a cycloaliphatic moiety, for example 1,6-hexane diol, dimethanol decalin, dimethanol bicyclooctane, 1,4-cyclohexane dimethanol (including its cis- and trans-isomers), triethylene glycol, 1,10-decanediol, and the like. Chemical equivalents of the diols include esters, such as $C_{1-3}$ dialkyl esters, diaryl esters, and the like.

Specific exemplary poly(alkylene terephthalate) polyesters include poly(ethylene terephthalate) (PET), poly(butylene terephthalate) (PBT), poly(ethylene naphthalate) (PEN), poly(butylene naphthalate) (PBN), and poly(1,3-propylene terephthalate) (PPT).

Another class of polyesters includes at least one cycloaliphatic moiety, for example poly(1,4-cyclohexylenedimethylene terephthalate) (PCT), poly(1,4-cyclohexylenedimethylene cyclohexane-1,4-dicarboxylate) also known as poly(cyclohexane-14-dimethanol cyclohexane-1,4-dicarboxylate) (PCCD), and poly(1,4-cyclohexylenedimethylene terephthalate-co-isophthalate) (PCTA).

Other useful polyesters are copolyesters derived from an aromatic dicarboxylic acid (specifically terephthalic acid and/or isophthalic acid) and a mixture comprising a linear $C_{2-6}$ aliphatic diol (specifically ethylene glycol and butylene glycol); and a $C_{6-12}$ cycloaliphatic diol (specifically 1,4-hexane diol, dimethanol decalin, dimethanol bicyclooctane, 1,4-cyclohexane dimethanol and its cis- and trans-isomers, 1,10-decane diol, and the like) or a linear poly($C_{2-6}$ oxyalkylene) diol (specifically, poly(oxyethylene) glycol) and poly(oxytetramethylene) glycol). The poly(oxyalkylene) glycol can have a molecular weight of 200 to 10,000 grams per mole, more specifically 400 to 6,000 grams per mole, even more specifically 600 to 2,000 grams per mole, and a carbon to oxygen ratio of 1 to 10, more specifically 1.5 to 6, even more specifically 2.0 to 4.3. The ester units comprising the two or more types of diols can be present in the polymer chain as individual units or as blocks of the same type of units.

Specific esters of this type include poly(1,4-cyclohexylene dimethylene co-ethylene terephthalate) (PCTG) wherein greater than 50 mol % of the ester groups are derived from 1,4-cyclohexanedimethanol; and poly(ethylene-co-1,4-cyclohexylenedimethylene terephthalate) wherein greater than 50 mol % of the ester groups are derived from ethylene (PTCG). Also included are thermoplastic poly(ester-ether) (TPEE) copolymers such as poly(ethylene-co-poly(oxytetramethylene) terephthalate. Also contemplated for use herein are any of the above polyesters with minor amounts, e.g., from 0.5 to 5 percent by weight, of units derived from aliphatic acid and/or aliphatic polyols to form copolyesters. The aliphatic polyols include glycols, such as poly(ethylene glycol) or poly(butylene glycol). Such polyesters can be made following the teachings of, for example, U.S. Pat. Nos. 2,465, 319 and 3,047,539.

The polyesters can be obtained by methods well known to those skilled in the art, including, for example, interfacial polymerization, melt-process condensation, solution phase condensation, and transesterification polymerization. Such polyester resins are typically obtained by the condensation or ester interchange polymerization of the diacid or diacid chemical equivalent component with the diol or diol chemical equivalent component with the component. The condensation reaction may be facilitated by the use of a catalyst of the type known in the art, with the choice of catalyst being determined by the nature of the reactants. For example, a dialkyl ester such as dimethyl terephthalate can be transesterified with butylene glycol using acid catalysis, to generate poly(butylene terephthalate).

It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition. The polyesters can have various known end groups. Recycled polyesters and blends of recycled polyesters with virgin polyesters can also be used.

PBT is especially useful for crosslinking. The PBT can be made from monomers or derived from PET, e.g., by a recycling process. The polyesters can have an intrinsic viscosity (as measured in phenol/tetrachloroethane (60:40, volume/ volume ratio) at 25° C.) of 0.2 to 2.0 deciliters per gram, and a weight average molecular weight of 5,000 to 160,000 g/mol, specifically 10,000 to 130,000 g/mol, against polystyrene standards, as measured by gel permeation chromatography in chloroform/hexafluoroisopropanol (5:95, volume/volume ratio) at 25° C.

A mixture of polyester resins with differing viscosities can be used to allow for control of viscosity of the final formulation. Combinations comprising two or more polyesters can also be used in the composition. An exemplary polyester combination is poly(ethylene terephthalate) and poly(1,4-butylene terephthalate).

The carboxy-reactive material is a material that has at least two functional groups capable of reacting with carboxy groups. As used herein "carboxy groups" includes carboxylic acids, carboxylate salts, and carboxylic acid esters, and "carboxy-reactive groups" are functional groups that form one or more covalent bonds with the carboxy groups under the crosslinking conditions. Examples of carboxy-reactive groups include epoxides, carbodiimides, orthoesters, oxazolines, oxiranes, aziridines, anhydrides, hydroxyls, and isocyanates. The carboxy-reactive material can also include other functionalities that are either reactive or non-reactive under the described processing conditions. The carboxy-reactive can be polymeric or non-polymeric. If desired, a catalyst or co-catalyst system can be used to accelerate the reaction between the carboxy-reactive material and the polyester component.

Particularly useful carboxy-reactive materials are polyfunctional, that is, have two or more carboxy-reactive groups, specifically three or more carboxy-reactive groups. In one embodiment, the two or more carboxy-reactive groups are terminal epoxy groups. In one embodiment, all of the carboxy-reactive groups are epoxy groups. Such polyfunctional epoxy compounds can contain aromatic and/or aliphatic residues, and can be non-polymeric or polymeric. Exemplary non-polymeric polyfunctional epoxy compounds include compounds having at least one, preferably two, terminal cycloaliphatic groups (e.g., 3,4-epoxycyclohexylmethyl-3,4-epoxycyclohexanecarboxylate, and epoxy-modified silicon-containing monomers). Exemplary polymeric compounds include epoxy novolac resins, epoxy phenol resins, epoxidized vegetable (e.g., soybean, linseed) oils, epoxy-modified silicone polymers, styrene-acrylic copolymers containing pendant glycidyl groups and oligomers, polymers and copolymers derived from glycidyl (meth)acrylates.

Specific polyfunctional polymeric compounds with reactive epoxy groups are the styrene-acrylic copolymers and oligomers containing glycidyl groups incorporated as side chains. Several useful examples are described in the International Patent Application WO 03/066704 A1 assigned to Johnson Polymer, LLC, incorporated herewith. These materials are based on oligomers with styrene and acrylate building blocks that have glycidyl groups incorporated as side chains. A high number of epoxy groups per oligomer chain can be used, for example at least 10, greater than 15, or greater than 20. These polymeric materials generally have a molecular weight greater than 3000, specifically greater than 4000, and more specifically greater than 6000. These are commercially available from Johnson Polymer, LLC (now owned by BASF) under the trade name JONCRYL, ADR 4368 material. Other types of polyfunctional polymer materials with multiple epoxy groups are acrylic and/or polyolefin copolymers and oligomers containing glycidyl groups incorporated as side chains. A further example of a such polyfunctional carboxy-reactive material is a co- or ter-polymer including units of ethylene and glycidyl methacrylate (GMA), available under the trade name LOTADER® resin, sold by Arkema. These materials can further comprise methacrylate unites that are not glycidyl. An example of this type is poly(ethylene-glycidyl methacrylate-co-methacrylate).

Novolac epoxy resins are glycidyl ethers of phenolic novolac resins. Phenols are reacted in excess, with formaldehyde in presence of acidic catalyst to produce phenolic novolac resin. Novolac epoxy resins are synthesized by reacting phenolic novolac resin with epichlorohydrin in presence of sodium hydroxide as a catalyst. Also contemplated are diglycidyl ethers of bisphenol A.

Useful polyfunctional carboxy-reactive materials include those having a mixture of different types of carboxy-reactive groups. In one embodiment, the materials comprise an epoxy group and another type of group, for example a hydroxyl, an isocyanate, or a silane. Such materials can be polymeric or non-polymeric. A useful polyfunctional non-polymeric carboxy-reactive material of this type comprises a combination of epoxy and silane functional groups, and in particular terminal cycloaliphatic epoxy groups and terminal silane groups. A specific epoxy silane of this type is of the formula:

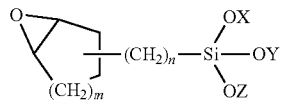

wherein m is an integer of 1-3, n is an integer of 1-6, and X, Y, and Z each independently $C_{1-20}$ alkyl, $C_{4-20}$ cycloalkyl, phenyl($C_{1-10}$ alkylene), or ($C_{1-6}$ alkyl)phenylene. In one embodiment, m is 2, n is 1 or 2, specifically 2, and X, Y, and Z are the same, specifically a $C_{1-3}$ alkyl. In another embodiment m is 2, n is 2, and X, Y, and Z are the same and are methyl or ethyl. Examples of such polyfunctional carboxy-reactive materials are molecules such as a tri-methoxy or tri-ethoxy silane also bearing an epoxy group, for example beta-(3,4-epoxycyclohexyl) ethyltriethoxysilane, sold as CoatOSil 1770 by GE. Other examples are β-(3,4-epoxycyclohexyl) ethyltrimethoxysilane, sold as Silquest A-186 by GE and 3-glycidoxypropyltriethoxysilane, sold as Silquest Y-15589 by GE.

Combinations of carboxy-reactive materials can be used. For example, an epoxy silane can be used together with another silane, such as a silyl isocyanurate of the formula

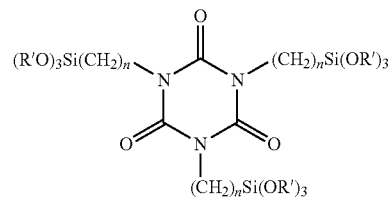

wherein each R' is independently the same or different $C_{1-6}$ alkyl group and each n is independently 1 to 6.

The relative amount of the polyester and the carboxy-reactive material will depend on the type and properties of the polyester, and the type and properties (e.g., reactivity) of the carboxy-reactive material, as well as the desired properties of the crosslinked polyester product. In general, the polyester component is present in the composition in an amount of 10 to 99.9 weight percent (wt %), and the carboxy-reactive component is present in an amount of 0.1 to 90 wt %, based on the combined weight of the polyester component and the carboxy-reactive component. In specific embodiments, the polyester component is present in an amount of 65 to 99 wt %, specifically 80 to 99 wt %, and the carboxy-reactive component is present in an amount of 1 to 35 wt %, specifically 1 to 20 wt %, based on the combined weight of the polyester component and the carboxy-reactive component. Alternatively, the amount of an epoxy-containing carboxy-reactive component can be calculated based on the weight of the polyester, wherein the epoxy material is used in an amount sufficient to provide 10 to 320 milliequivalents of epoxy groups per 1.0 kg of the polyester.

A catalyst and optional co-catalyst can be used to catalyze the reaction between the carboxy-reactive material and the polyester. If present, the catalyst can be a hydroxide, hydride, amide, carbonate, borate, phosphate, $C_{2-36}$ carboxylate, $C_{2-18}$ enolate, or a $C_{2-36}$ dicarboxylate of an alkali metal such as sodium, potassium, lithium, or cesium, of an alkaline earth metal such as calcium, magnesium, or barium, or other metal such as zinc or a lanthanum metal; a Lewis catalyst such as a tin or titanium compound; a nitrogen-containing compound such as an amine halide or a quaternary ammonium halide (e.g., dodecyltrimethylammonium bromide), or other ammonium salt, including a $C_{1-36}$ tetraalkyl ammonium hydroxide or acetate; a $C_{1-36}$ tetraalkyl phosphonium hydroxide or acetate; or an alkali or alkaline earth metal salt of a negatively charged polymer. Mixtures comprising at least one of the foregoing catalysts can be used, for example a combination of a Lewis acid catalyst and one of the other foregoing catalysts.

Specific exemplary catalysts include but are not limited to alkaline earth metal oxides such as magnesium oxide, calcium oxide, barium oxide, and zinc oxide, tetrabutyl phosphonium acetate, sodium carbonate, sodium bicarbonate, sodium tetraphenyl borate, dibutyl tin oxide, antimony trioxide, sodium acetate, calcium acetate, zinc acetate, magnesium acetate, manganese acetate, lanthanum acetate, sodium benzoate, sodium stearate, sodium benzoate, sodium caproate, potassium oleate, zinc stearate, calcium stearate, magnesium stearate, lanthanum acetylacetonate, sodium polystyrenesulfonate, the alkali or alkaline earth metal salt of a PBT-ionomer, titanium isopropoxide, and tetraammonium hydrogensulfate. Mixtures comprising at least one of the foregoing catalysts can be used.

In another specific embodiment, the catalyst can be a boron-containing compound such as boron oxide, boric acid, a borate salt, or a combination comprising at least one of the foregoing boron-containing compounds. More particularly, boric acid and/or a borate salt is used, even more particularly a borate salt. As used herein, a "borate salt" (or simply "borate") means the salt of a boric acid. There are different boric acids, including metaboric acid ($HBO_2$), orthoboric acid ($H_3BO_3$), tetraboric acid ($H_2B_4O_7$), and pentaboric acid ($HB_5O_9$). Each of these acids can be converted to a salt by reaction with a base. Different bases can be used to make different borates. These include amino compounds, which give ammonium borates, and hydrated metal oxides such as sodium hydroxide, which gives sodium borates. These borates can be hydrated or anhydrous. For example, sodium tetraborate is available in the anhydrous form, and also as the pentahydrate and the decahydrate. Suitable borate salts are alkali metal borates, with sodium, lithium, and potassium being preferred, and with sodium tetraborate being especially suitable. Other suitable metal borates are divalent metal borates, with alkaline earth metal borates being preferred, in particular calcium and magnesium. Trivalent metal borates, such as aluminum borate, can also be used.

In another embodiment, the catalyst is a salt containing an alkali metal compound, for example an alkali metal halide, an alkali metal $C_{2-36}$ carboxylate, an alkali metal $C_{2-18}$ enolate, an alkali metal carbonate, an alkali metal phosphate, and the like. Illustrative compounds within this class are lithium fluoride, lithium iodide, potassium bromide, potassium iodide, sodium dihydrogen phosphate, sodium acetate, sodium benzoate, sodium caproate, sodium stearate, and sodium ascorbate.

In still another embodiment, a metal salt of an aliphatic carboxylic acid containing at least 18 carbon atoms, particularly an alkali metal stearate such as sodium stearate has certain advantages. For example, use of one of these catalysts allows extrusion of the polyester compositions at substantially higher feed rates than the rates usable in the absence of such catalysts. These catalysts also tend to suppress the formation of acrolein, a by-product from glycidyl reagents. The catalysts can also impart substantially less odor to the composition than certain other compounds useful as catalysts, especially amines.

The type and amount of the catalyst will depend on the desired characteristics of the composition, the type of polyester used, the type and amount of the carboxy-reactive material, the type of catalyst, the type and amount of other additives present in the composition, and like considerations, and is selected to provide the desired degree of crosslinking. Such amounts can be at least 1 part per million (ppm) based on the weight of the total composition. In one embodiment, the amount of the catalyst is 1 ppm to 0.2 wt % of the total weight of the composition.

The crosslinked polyester compositions can include various additives ordinarily incorporated into resin compositions of this type, with the proviso that the additives are selected so as to not significantly adversely affect the desired properties of the thermoplastic composition. Exemplary additives include other polymers (including impact modifiers), fillers, antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame retardants, anti-drip agents, and radiation stabilizers. Combinations of additives can be used. Such additives can be present during crosslinking or added after crosslinking at any suitable time during the mixing of the components for forming the composition. Except for other polymers and fillers, the additives are generally present in an amount from 0.0005 to 20 wt. %, specifically 0.01 to 10 wt. %, based on the total weight of the composition.

Other polymers that can be combined with the polyesters include polycarbonates, polyamides, polyolefins, poly(arylene ether)s, poly(arylene sulfide)s, polyetherimides, polyvinyl chlorides, polyvinyl chloride copolymers, silicones, silicone copolymers, $C_{1-6}$ alkyl (meth)acrylate polymers (such as poly(methyl methacrylate)), and $C_{1-6}$ alkyl (meth)acrylate copolymers, including impact modifiers.

Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used. Specific impact modifiers include a natural rubber, a low-density polyethylene, a high-density polyethylene, a polypropylene, a polystyrene, a high-impact polystyrene (HIPS), a polybutadiene, a styrene-butadiene copolymer, a styrene-butadiene-styrene (SBS), a styrene-butadiene rubber (SBR), a styrene-ethylene-butadiene-styrene (SEBS), an acrylonitrile-butadiene-styrene (ABS), an acrylonitrile-ethylene-propylene-diene-styrene (AES), an acrylic-styrene-acrylonitrile (ASA), styrene-isoprene-styrene (SIS), a methyl methacrylate-butadiene-styrene (MBS), a styrene-acrylonitrile (SAN), an ethylene-propylene copolymer, an ethylene-propylene-diene terpolymer, an ethylene-methyl acrylate copolymer, an ethylene-ethyl acrylate copolymer, an ethylene-vinyl acetate copolymer, an ethylene-glycidyl methacrylate copolymer, a polyethylene terephthalate-poly(tetramethyleneoxide)glycol block copolymer, a polyethylene terephthalate/isophthalate-poly(tetramethyleneoxide)glycol block copolymer, a silicone rubber, or a combination comprising at least one of the foregoing impact modifiers.

A combination comprising different additional polymers can be used. The additional polymer can be present as a major or minor component of the composition comprising the thermally crosslinked composition, i.e., an amount of 1 to 99 wt.% of the total composition. When an impact modifier is used. the impact modifier is present in amounts of 2 to 30 wt %, based on the total weight of the composition.

Additionally, the crosslinked polyester compositions can further comprise particulate fillers, for example alumina, amorphous silica, anhydrous alumino silicates, mica, wollastonite, barium sulfate, zinc sulfide, clays, talc, and metal oxides such as titanium dioxide, carbon nanotubes, vapor grown carbon nanofibers, tungsten metal, barites, calcium carbonate, milled glass, flaked glass, ground quartz, silica, zeolites, and solid or hollow glass beads or spheres, and fibrillated tetrafluoroethylene. Reinforcing fillers can also be present. Suitable reinforcing fillers include fibers comprising glass, ceramic, or carbon, specifically glass that is relatively soda free, more specifically fibrous glass filaments comprising lime-alumino-borosilicate glass, which are also known as "E" glass. The fibers can have diameters of 6 to 30 micrometers. The fillers can be treated with a variety of coupling agents to improve adhesion to the polymer matrix, for example with amino-, epoxy-, amido- or mercapto-functionalized silanes, as well as with organometallic present, are used in amounts effective to provide the desired effect (e.g., increased strength), for example 0.1 to 50 wt. % of the total composition.

Different methods can be used for the manufacture of the crosslinked polyester compositions. In one embodiment, the thermally crosslinked polyester compositions are formed by contacting the polyester and the carboxy-reactive material (and optional catalyst) at a temperature and for a length of time sufficient to result in thermal crosslinking. The temperature and time of contact will depend on the type and amount of polyester, carboxy-reactive material, catalyst system (if present) and other additives (if present), as well as the desired degree of crosslinking. Useful temperatures will be effective to crosslink the polyesters efficiently, but not so high as to result in significant degradation of the polyester or other components. Crosslinking of many polyesters can be performed at 140 to 220° C. for 2 to 20 hrs, specifically 160 to 200° C. for 6 to 12 hours.

The thermal crosslinking can be performed as a separate step, or as part of a manufacturing process, for example, an extrusion process. For example, the polyester, carboxy reactive material, catalyst system (if present), and other additives (if present) can be combined by dry mixing the components, followed by mixing in the melted state in an extruder at a temperature and for a time effective to crosslink the polyester, and the crosslinked polyester extruded in the desired shape for subsequent use. In one embodiment, the extruded blend is comminuted into pellets or other suitable shapes. The pellets can be used for subsequent molding, shaping, or forming.

Alternatively, the components of the composition can be melt blended, in a mixer or an extruder, for example, at a temperature and for a time that does not substantially thermally crosslink the composition. The non-crosslinked composition can then be isolated, e.g., extruded and comminuted into pellets or other suitable shapes. The melt-mixed blend can then be stored, shipped, and subsequently thermally crosslinked.

The degree of crosslinking in the composition can be adjusted by varying the type of polyester, crosslinking catalyst, and optional catalyst and other additives, as well the relative amounts of each component in the composition; and by the conditions used to crosslink the composition, including the temperature and time of crosslinking. The amount of crosslinking to be achieved will depend on the desired characteristics of the composition. The gel content of the extracted polymer can serve as indicator of crosslinking. A method for measuring gel content is described in the Examples below. In one embodiment, the gel content of the crosslinked polymer is at least 5 wt. % of the polymer, specifically at least 10 wt. %, at least 20 wt. %, at least 30 wt. %, at least 40 wt. %, at least 50 wt. %, at least 60 wt. %, at least 70 wt. %, at least 80 wt. %, or at least 90 wt. % of the total weight of the polymer, up to 100 wt. % of the total polymer. In a specific embodiment, the crosslinked polyester has a gel content of 5 to 90 wt. % of the polymer, more specifically 5 to 50 wt. % of the polymer.

The physical properties of the thermally crosslinked polyester composition (or an article derived from the composition) can be varied, depending on properties desired for the application. The flexural modulus, for instance, is generally at least 5% more than the flexural modulus of the same composition that is not crosslinked, that is, not subjected to time and temperature conditions that crosslink the polyester. In another embodiment, the flexural modulus is from 10% to 25% more of the flexural modulus of but the same composition that is not subjected to conditions that promote the crosslinking of the polyester. The flexural modulus can be measured by a three-point flexural test according to ASTM D790 on 13 mm×126 mm× of 3.2 mm test bars.

The flex strain at 5% strain of the crosslinked composition is generally at least 5% more than the flex strain at 5% of the same composition that is not crosslinked. In another embodiment, the flex strain at 5% strain is from 10% to 30% more than the flex strain at 5% of the same composition that is not crosslinked. The flex strain at 5% strain can be measured by a three-point flexural test according to ASTM D790 on 13 mm×126 mm× of 3.2 mm test bars.

The flexural strength at yield of the crosslinked composition is generally at least 5% more than the flexural strength at yield of the same composition that is not crosslinked. In another embodiment, the flexural strength at yield is from 10% to 30% more than the flexural strength at yield of the same composition that is not crosslinked. The flexural strength at yield can be measured by a three-point flexural test according to ASTM D790 on 13 mm×126 mm× of 3.2 mm test bars.

The heat deflection temperature (HDT) at 1.82 MPa of the crosslinked composition is generally at least 5° C. more than the HDT of the same composition that is not crosslinked. In another embodiment, the HDT of the crosslinked composition at 1.82 MPa is from 5° C. to 40° C. more than the HDT of the same composition that is not crosslinked. The HDT at 1.82 MPa can be measured on 3.2 mm×126 mm×13 mm test bars according to ASTM D648.

The HDT at 0.455 MPa of the crosslinked composition is generally at least 5° C. more than the HDT of the same composition that is not crosslinked. In another embodiment, the HDT at 0.455 MPa of the crosslinked composition is from 5° C. to 50° C. more than the HDT of the same uncrosslinked composition. The HDT at 0.455 MPa can be measured on 3.2 mm×126 mm×13 mm test bars according ASTM D648.

The IZOD notched impact (INI) of the thermally crosslinked composition is generally the same or less as an uncrosslinked composition made from the same reactants but not subjected to crosslinking conditions. In one embodiment, the INI is from 10 to 15 kilojoules per square meter less than the INI of the same composition that is not crosslinked. The INI can be measured on 3×½×⅛ inch (76×13×3 mm) bars according to ASTM D256 at 23° C.

The unnotched IZOD impact strength of the crosslinked composition is generally the same or less than an uncrosslinked composition made from the same reactants but not subjected to crosslinking conditions. In one embodiment, the unnotched IZOD impact strength is from 10 to 25 joules per meter less than the unnotched IZOD impact strength of the same composition that is not crosslinked. The unnotched IZOD impact strength can be measured using a pendulum of 5.5 Joule on 80×10×4 mm (length×wide×thickness) impact bars according to ISO 180.

The tensile stress at yield of the composition is generally at least 5% more than the tensile stress at yield of the same uncrosslinked composition. In another embodiment, the tensile stress at yield is from 5% to 30% more, than the tensile stress at yield of the same composition when it is not crosslinked. The tensile stress at yield can be measured on 3.2 mm thick test bars according to ASTM D638.

The tensile stress at break of the composition is generally at least 5% more than the tensile strength at break of the same composition when it is not crosslinked. In another embodiment, the tensile stress at break is from 5% to 30% more than the tensile stress at break of the same composition when it is not crosslinked. The tensile stress at break can be measured on 3.2 mm thick test bars according to ASTM D638.

The elongation at yield of the composition is generally same or less than the elongation at yield of the same composition when it is not crosslinked. In one embodiment, the elongation at yield is from 10 to 20% less than the elongation at yield of the same composition that is not crosslinked. The elongation at yield can be measured in accordance with ASTM D638.

The elongation at break is generally the same or less than the elongation at break of the same composition when it is not crosslinked. In another embodiment, the elongation at break is from 10 to 50% less than the elongation at break of the same composition when it is not crosslinked. The elongation at break can be measured in accordance with ASTM D638.

The thermally crosslinked polyester compositions can be formed into shaped articles by a variety of known processes for shaping molten polymers, such as injection molding, rotational molding, compression molding, extrusion, thermoforming, blow molding, and gas assist injection molding. Examples of such articles include electrical connectors, enclosures for electrical equipment, e.g., a battery cover, automotive engine parts, components for electronic devices, lighting sockets and reflectors, electric motor parts, power distribution equipment, communication equipment, tiles, e.g., decorative floor tiles.

The thermally crosslinked polyester can also be made into films and sheets. Such films and sheets can be used as formed, or further modified, for example by thermoforming.

The thermally crosslinked polyester compositions can also be used in conjunction with an additional polymer, for example a polyolefin, and used to make toys, furniture, e.g., outdoor furniture, and the like. In one embodiment, the article comprises a visual effect additive. In another embodiment, the article is free of visual effect additives.

In another embodiment, the polyester compositions are formed into particulates and used, for example, as additives (e.g., fillers) for other polymer compositions. The shape and size of the particulates, as well as the amount used, will depend on the desired properties of the polyester composition. One use of particulate crosslinked polyesters is to adjust the optical properties, e.g., the appearance of transparent objects, and/or total transmittance of an object, e.g., clarity and/or haze. When used to modify total transmittance, the crosslinked polyester particles can have, for example, an average diameter of 0.5 to 1200 micrometers, specifically 10 to 100 micrometers. The particles can be present in the polymer compositions in amounts from 0.001 to 20 wt %, specifically 0.1 to 10 wt % of the total weight of the composition.

In one embodiment, addition of a particulate crosslinked polyester increases the haze (wide angle scattering) of a composition. In another embodiment, addition of a particulate crosslinked polyester decreases the clarity (narrow angle light scattering) of the composition.

In a specific embodiment, the thermally crosslinked polyester composition includes a visual effect additive. Visual effect additives include inorganic colorants and organic colorants, as well as functional colorants. Examples of such colorants include luminescent materials (e.g., phosphorescent and/or fluorescent materials), thermochromic, photochromic, or brightening materials. Luminescent colorants also include materials such as phosphors, e.g., storage phosphors, fluorophores, phosphorescent materials, and optical brighteners. Examples of suitable phosphors include laser detection phosphors which can detect lasers by converting infra-red energy to visible wavelengths, storage phosphors, which respond to infra-red energy following a charge up step using daylight or ultraviolet light energy, and anti-stokes materials. Anti-stokes materials can also include dyes. Materials that can provide luminescent effects include the luminescent materials listed in U.S. Pat. Nos. 5,573,909, 6,514,617 B1, and publication U.S. Pat. Pub. 20050112768.

Useful pigments include, for example, inorganic pigments. Exemplary inorganic pigments include metal oxide hydroxides and metal oxides such as zinc oxide, titanium dioxides, iron oxides, chromium oxides, europium oxide, cerium oxide, colored alumina oxide particles or the like. Inorganic pigments can also include carbonates such as calcium and cobalt carbonate; titanates based on the rutile (chromium antimony titanate and nickel antimony titanate), spinel (cobalt and iron titanates), priderite, and pseudobrookite pigment structures. Other exemplary pigments include (i) aluminates such as cobalt aluminates and cobalt chromium aluminates; (ii) chromites such as copper chromite black and cobalt chromite green; (iii) ferrites such as the pure ferrite spinels that contain magnesium and zinc, mixed chromite/ferrite spinels, and mixed chromium iron pigments identified as Pigment Green 17 or Pigment Brown 29; (iv)sulfides and sulfates such as cadmium sulfides and sulfoselenides, cerium sulfides, zinc sulfide, barium sulfate, and strontium sulfate; (v) bismuth pigments such as bismuth vanadate, yittrium and cerium substituted bismuth oxide to form mixed oxides; (vi) chromates; (vii) silicates such as ultramarine and zirconium silicate pigments; (viii) cyanides such as the Fe(II)Fe(III) cyano complexes; (ix) calcium, lanthanum, and tantalum oxide-nitrides; manganese and cobalt phosphates; (x) carbon black; (xi) luminescent pigments such as sulfides and sulfoselenides, alkaline-earth sulfides and sulfoselenides oxysulfides, borates, aluminates, gallates, silicates, germinates, halophosphates and phosphates, oxides, arsenates, vanadates for example yttrium vanadates, niobates and tantalates, sulfates, tungstates and molybdates, alkali-metal halides, alkaline-earth halides, including anti-stokes shift pigments, oxyhalides; (xii) quantum effect pigments such as nanoscale silicon with a particle size less than 5 nanometers; semiconducting luminescent nanoparticles such as $Cd_3P_2$, and PbS; storage phosphors such as CaS:Eu,Sm.

Phosphorescent materials include ZnS:Cu and SrS:Bi. Phosphors that can be used include those based on $MAl_2O_4$ wherein M is a metal such as calcium, strontium, barium, or a combination comprising at least one of the foregoing metals. The matrix can be doped with europium and dysprosium.

Useful organic pigments and dyes include acridine dyes, aminoketone dyes, anthracene derivatives, anthraquinones, aryl- or heteroaryl-substituted poly ($C_{2-8}$) olefin dyes, arylmethane dyes, azine dyes, azo dyes, azo lakes, azos, benzimidazolone pigments, benzothiazole, benzoxazole, bis(hydroxyflavones), bis(styryl)biphenyl dyes, bisbenzoxazolylthiophene (BBOT), carbocyanine dyes, carbostyryl dyes, chrysene, coronene, coumarin dyes such as coumarin 460 (blue) and 7-amino-4-methylcoumarin, nile red or the like, cyanine dyes, diazonium dyes, di-azos, di(imminiums), diketopyrrolopyrrole, dioxazines such as dioxazine violet, enthrones, flavanthrones, infrared (IR) absorbers such as IR1000 from ColorChem International Corp., fluorophores such as anti-stokes shift dyes which absorb in the near infrared wavelength and emit in the visible wavelength, fluoroscein, hydrocarbon and substituted hydrocarbon dyes, hydroxyflavones, imidazole derivatives, indanthrone dyes, indigoid dyes, isoindolinones, lactone dyes, lanthanide chelates, metal dithiol complexes, methine dyes, naphthalimide derivatives, nitro dyes, oxazines, perinones, perylenes, phthalocyanine dyes, phthalocyanines, polyazaindacenes, polycyclic aromatic hydrocarbon dyes, porphyrin dyes, pyrazolines, pyrazolones, pyrene, pyrilium, quinacridones, quinone imine dyes, quinophthalones, rhodamine 700, rhodamine 800, rhodamines and all their derivatives, rubrene, scintillation dyes such as oxazole or oxadiazole dyes, squarylium, stilbenes, tetrachloroisoindolinones, tetrazolium dyes, thermochromic pigments, thiazole dyes, thiapyrillium, triarylammonium, thiazinex, thioindigoid dyes, thiophenes, thioxanthenes, triarylmethanes, triarylammoniums, xanthenes, 1,1'-diethyl-2,2'-carbocyanine iodide, 2-(1-naphthyl)-5-phenyloxazole, 2-(4-(4-dimethylaminophenyl)-1,3-butadienyl-3-ethylbenzothiazolium perchlorate, 2-(4-biphenylyl)-5-(4-t-butylphenyl)-1,2,2'-dimethyl-p-quaterphenyl, 2,2-dimethyl-p-terphenyl, 2,2'-p-phenylen-bis (5-phenyloxazole), 2,5-bis-(4-biphenylyl)-oxazole, 2,5-diphenylfuran, 2,5-diphenyloxazole, 3-(2'-benzothiazolyl)-7-diethylaminocoumarin, 3,3'-diethyl-4,4',5,5'-dibenzothiatricarbocyanine iodide, 3,4-oxadiazole, 3,5,3',5'-tetra-t-butyl-p-quinquephenyl, 3-diethylamino-7-diethyliminophenoxazonium perchlorate, 4,4'-diphenylstilbene, 4-dicyanomethylene-2-methyl-6-(p-dimethyl aminostyryl)-4H-pyran, 7-dimethylamino-1-methyl-4-methoxy-8-azaquinolone-2,7-dimethylamino-4-methylquinolone-2, and the like.

Other colorants can also include mica, iron mica, metal oxide mica, antimony trioxide, angular metameric pigment, cholesteric liquid crystal, metal oxide coated glass, a metal flake, or a combination comprising at least one of the foregoing materials. In one embodiment, the visual effect additive is a metal flake having a largest diameter of 17.5 to 650 micrometers. The metal flake can comprise aluminum, bronze, brass, chromium, copper, gold, an alloy comprising a least one of the foregoing materials, or a combination comprising at least one of the foregoing materials.

Colorants also include materials with magnetic properties e.g., magnetic pigments such as chromium dioxide, iron oxides, and cobalt-containing iron oxides. A combination comprising one or more of any of the foregoing different types of visual effect additives can be used.

The visual effect additive is used in the composition in an amount effective to provide the desired effect, and which can vary widely depending on the additive and desired visual effect. In one embodiment, the visual effect additive is present in an amount of 0.0005 to 20 wt %, specifically 0.01 to 10 wt % of the total weight of the composition.

The visual effect additive can be incorporated into the thermally crosslinked polyester composition at any point in the manufacture thereof, as described for the additives above. In one embodiment, the visual effect additive is added during manufacture of a polyester, that is, during condensation of the dicarboxylic acid (or its chemical equivalent, e.g., dimethyl terephthalate) and the diol, e.g., butanediol (or its chemical equivalent). Alternatively, the visual effect additive is combined with the polyester immediately before or during the thermal crosslinking of the polyester and the carboxy reactive material. The resulting thermally crosslinked composition can then be extruded and/or comminuted to particles, for example by grinding.

When a visual effect additive is present, the thermally crosslinked compositions can be used in numerous applications. For instance, the compositions can be highly effective as encapsulated visual effect additives, for example in applications requiring encapsulated colorants used for decorative purposes, chemical stabilization of colorants, and/or detection systems, e.g., taggants used in security/authentication systems, among others.

Useful encapsulated visual effect additives are in the form of particles comprising the visual effect additive(s) and the thermally crosslinked polyester. The particles are then combined with another polymer composition. The particle size of the encapsulated visual effect additive can be adjusted by methods known in the art, e.g., grinding, hammer-milling, chipping, shredding, crushing, and the like. Suitable particle sizes for the encapsulated additive can vary widely depending on the type and amount of polyester/crosslinked polyester, carboxy-reactive material, visual effect additive and any other additives, and the desired properties of the final composition. In general, the size of the particles is adjusted so as to provide the desired visual effect, but not so low or so high as to substantially adversely impact processing or a desired property of the composition. Typically, the particles have an average diameter of 0.5 to 1200 micrometers, specifically 10 to 100 micrometers.

When used as an encapsulated visual effect additive, the visual effect additive is present in an amount of 0.0005 to 20 wt %, specifically 0.01 to 10 wt %; and the thermally crosslinked reaction product of a polyester and a carboxy-reactive material is present in an amount of 80 to 99.9995 wt %, specifically 90 to 99.95 wt %, wherein each of the foregoing amounts is based on the combined weight of the visual effect additive and the thermally crosslinked reaction product.

Encapsulation (which as used herein includes partial encapsulation) can protect the visual effect additive from chemical attack and/or modify a property of the visual effect additive. In general, a higher degree of encapsulation is used where the crosslinked polyester is to provide a protective effect. As used herein "at least partially encapsulated" means that at least a portion of the surface of a visual effect additive is covered by the crosslinked polyester, specifically at least 25%, more specifically at least 50%, and even more specifically at least 75% of the surface of the visual effect additive is covered by the crosslinked polyester. To achieve protective effects, it is desirable to have at least 80% of the surface of a visual effect additive covered by the crosslinked polyester, specifically at least 90%, more specifically at least 95%. In some embodiments, the visual effect additive is fully encapsulated.

The encapsulated visual effect particles can be incorporated into a polymer composition at any point in the manufacture of the composition as is known in the art. In one embodiment, the encapsulated particles are mixed with the polymer composition (by dry blending, solution blending, or melt mixing) before processing (e.g., casting or extrusion) of the polymer composition. In another embodiment, the encapsulated particles are added during processing (e.g., extrusion, and injection molding) of the polymer composition.

The polymer composition can include a thermoplastic polymer, a thermosetting polymer, or a combination comprising a thermoplastic and a thermosetting polymer. In one embodiment, in order to achieve the maximum protective benefit of encapsulation of the visual effect additive as described below, the melt temperature of the polymer is within 120° C. of the melt temperature of the crosslinked polyester. Thus, very high melting temperature polymers such as liquid crystalline polymers, poly(ether ether) ketones and high melt temperature nylons are excluded from certain embodiments.

The amount of at least partially encapsulated particles in the final composition will vary, depending on the type of crosslinked polyester, carboxy-reactive material, visual effect additive and any other additives, the degree of encapsulation, and the desired properties of the composition. In general, the amount of the at least partially encapsulated particles is adjusted so as to provide the desired visual effect, but not so low or so high as to substantially adversely impact processing or a desired property of the composition. Typically, the particles are present in the composition in an amount of 0.01 to 45 wt %, specifically 0.1 to 10 wt %, based on the total weight of the composition.

The at least partially encapsulated colorants can be used in a wide variety of applications. For example, encapsulation can provide a protective effect for visual effect additives that are acid-sensitive and/or water-sensitive. Sulfur containing pigments often fall into this category, for example, lanthanide metal sulfide, cerium sulfide, cadmium sulfide, cadmium sulfoselenide, ultramarine blue, ultramarine violet, zinc sulfide, or a combination comprising at least one of the foregoing materials. In one embodiment, the additive includes sulfide chromophore. Accordingly, a possible application involves stabilization of sulfur-containing pigments or additives to prevent emission of hydrogen sulfide gas.

Blending of functional colorants such as phosphorescent powder into a polymer matrix generates an article that emits lights and is perceived as a uniform glowing light source. However, where the phosphorescent colorant is first at least partially encapsulated, pellets or fine-grind particles can be used to generate random and discrete phosphorescent regions when combined with another polymer (e.g., another polyester such as poly(butylene) and injection molded.

Encapsulated colorants can be utilized in applications where the materials require authentication. In this embodiment, a colorant having traceable properties is used, and the crosslinked polyester is used to encapsulate functional pigments for use as a covert additive or taggant in anti-piracy applications. A method of providing a composition with anti-piracy or other tagging or tracing features comprises combining a polymer with a tracer material, e.g., a fluorophore, phosphorescent material, optical brightener, ferromagnetic pigment, or the like, that has been at least partially encapsulated with a crosslinked polyester. Articles formed from such compositions are also within the scope of the present invention.

Alternatively, the encapsulated visual effect additive can be used in applications that use materials that are aesthetically pleasing. Effects such as mottling and a "granite" appearance can be achieved.

The polyester compositions are further illustrated by the following non-limiting examples. The amounts of all components in the Tables below are provided in percent by weight, based on the total weight of the blend components. Components used in the formulations are shown in Table 1.

EXAMPLES

TABLE 1

| Name | Material | Source |
|---|---|---|
| PBT-315 | Poly(1,4-butylene terephthalate), IV = 1.2 deciliters per gram, measured in 60:40 phenol/tetrachloroethane (VALOX) | GE Plastics |
| PBT 195 | Poly(1,4-butylene terephthalate), IV = 0.7 deciliters per gram, measured in 60:40 phenol/tetrachloroethane (VALOX) | GE Plastics |
| PET 9612 | Poly(1,4-ethylene terephthalate), IV = 0.52 deciliters per gram, measured in 60:40 phenol/tetrachloroethane (VALOX) | Diolen Industrial Fibers bv |
| NaSt | Sodium stearate (catalyst) | |
| PETS | Pentaerythritol tetrastearate | |
| Phosphite | 2,4-di-tert-butylphenol phosphite (IRGAPHOS 168) | Ciba Geigy |
| Coat-O-Sil 1770 | Beta-(3,4-epoxycyclohexyl) ethyltriethoxysilane | GE Silicones |
| SILQUEST Y-11597 | Tris(3-trimethoxysilyl)propyl)isocyanurate | GE Silicones |
| Sn catalyst | Dibutyltin bis(2-ethylhexanoate) | Aldrich |
| I-1010 | Pentaerythritol tetrakis(3,5-di-tert-butyl-4-hydroxyhydrocinnamate) (IRAGANOX 1010) | Ciba Geigy |
| | Pentaerythritol-tetrakis(3-(3,5-di-tert-butyl-4-hydroxy phenyl-)propionate) | Ciba Geigy |
| Wax | Mixture of alpha-olefin and hydrocarbon wax | |
| Antistat | Alkyl sodium sulfonate (antistatic agent) | Ciba Geigy |
| PP | Strontium-europium-dysprosium aluminates (phosphorescent pigments; Luminova GLL-300FFS) | Luminova |
| $TiO_2$ | Titanium dioxide | Millenium |
| Pigment Blue 29 | Sodium aluminum silicate containing sulfur | Nubiola |

TABLE 1-continued

| Name | Material | Source |
|---|---|---|
| Pigment Green 50 | Cobalt titanate green spinel | Ferro Corporation |
| Pigment Blue 28 | Cobalt aluminate | Shepherd Chemical company |
| 20% Pigment Blue 15:4 PBT dispersion | Copper phthalocyanine blue | Sun Chemical |

Except where indicated, the components of the polyester compositions were tumble blended compounded on a twin screw extruder with a vacuum vented mixing screw, at a barrel and die head temperature of 240 to 265° C., and a screw speed of 300 revolutions per minute (rpm). The extrudate was cooled through a water bath, and then pelletized.

To determine the gel content in polyester, 0.2 g of pre-weighed polyester is immersed in 2.5 mL Hexafluoroisopropanol (HFIP) and shaken gently overnight to promote dissolution of the soluble portion. 47.5 mL of $CHCl_3$ is s then added to the above mixture, and the sample allowed to stand overnight. The insoluble fraction is then filtered through filter paper, rinsed with excess HFIP/$CHCl_3$ solution, separated from the filter paper carefully, dried, and weighed. The weight percentage of insoluble portion in the total sample is the gel fraction.

Thermal crosslinking at the indicated temperature was performed in accordance with ASTM D3045. Parts were removed from the oven, allowed to cool and equilibrate at 50% relative humidity for at least two days before testing.

Test articles were molded on an Engel 110T or van Dorn molding machine with a set temperature of about 240-265° C. Except where indicated the pellets were dried for 2-4 hours at 120° C. in a forced air circulating oven before injection molding. It will be recognized by those skilled in the art that the method is not limited to these temperatures or to this apparatus.

Tensile properties were tested according to ISO 527 on 150×10×4×mm (length×wide×thickness) injection molded bars at 23° C. with a crosshead speed of 5 mm/min.

Izod unnotched impact was measured at 23° C. with a pendulum of 5.5 Joule on 80×10×4 mm (length×wide×thickness) impact bars according to ISO 180.

Izod Notched Impact (INI) testing was performed on 3×½×⅛ inch (76×13×3 mm) bars according to ASTM D256 at 23° C.

Flexural properties or three point bending were measured at 23° C. on 80×10×4 mm (length×wide×thickness) impact bars with a crosshead speed of 2 mm/min according to ISO 178.

Tensile elongation at break was tested on 7×⅛ inch (178×3.1 mm) injection molded bars at 23° C. with a crosshead speed of 0.2 in/min (5 mm/min) for un-filled samples by using ASTM D648.

Biaxial impact testing, sometimes referred to as instrumented impact testing, was performed per ASTM D3763 using a 4×⅛ inch (102×3.1 mm) molded discs. The total energy absorbed by the sample is reported as ft-lbs or J.

Heat deformation temperature (HDT) at 1.82 MPa is measured on 3.2 mm×126 mm×13 mm test bars according ASTM D648.

Comparative Example 1; Examples 1-3

Polyester compositions as set forth in Table 2 were extruded with (Exs. 1-4) and without (Ex. C1) a crosslinking agent (beta-(3,4-epoxycyclohexyl) ethyltriethoxysilane) and crosslinking catalyst (sodium stearate). After extrusion, the pellets were stored in a forced air circulating oven at 180° C. for 2-50 hours to induce crosslinking. The gel content of the samples was determined, and is reported in Table 2 below.

TABLE 2

| Component | Unit | C1 | E1 | E2 | E3 | E4 |
|---|---|---|---|---|---|---|
| PBT 315 | % | 99.94 | 98.94 | 97.94 | 96.94 | 94.83 |
| CoatOSil 1770 | % | 0.0 | 1.0 | 2.0 | 3.0 | 3.0 |
| NaSt | % | 0.01 | 0.01 | 0.01 | 0.01 | 0.02 |
| I-1010 | % | 0.05 | 0.05 | 0.05 | 0.05 | 0.05 |
| 20% Pigment Blue 15:4 PBT dispersion | % | — | — | — | — | 1.25 |
| Pigment Blue 28 | % | — | — | — | — | 0.5 |
| Pigment Green 50 | % | — | — | — | — | 0.05 |
| $TiO_2$ | % | — | — | — | — | 0.05 |
| Carbon black | % | — | — | — | — | 0.002 |
| Gel % after 1 hr at 180° C. | % | 0 | 0 | 0 | 7.3 | 15.2 |
| Gel % after 2 hr at 180° C. | % | 0 | 0 | 7.1 | 26.7 | 42.5 |
| Gel % after 4 hr at 180° C. | % | 0 | 0 | 31.2 | 43 | 60.5 |
| Gel % after 20 hr at 180° C. | % | 0 | 0 | 49.2 | 68.1 | 82.5 |
| Gel % after 27 hr at 180° C. | % | 0 | 2.9 | 46.5 | 69.7 | 85.6 |
| Gel % after 49 hr at 180° C. | % | 0 | 8.3 | 53.7 | 70 | 86.2 |

As can be seen from the results in Table 2, no crosslinking is observed in Comparative Ex. 1, while increasing gel content is observed over time and with an increased amount of crosslinking agent.

The formulation of Example 4 was extruded and aged at 200° C. for 0 to 32 hours. A summary of the physical and thermal properties after various time intervals of thermal aging are shown in Table 3.

TABLE 3

| | Unit | E4 | E4 | E4 | E4 | E4 | E4 |
|---|---|---|---|---|---|---|---|
| Thermoaging time at 200° C. | Hrs | 0 | 2 | 4 | 8 | 20 | 32 |
| Flexural Modulus | MPa | 3270 | 2740 | 3800 | 3850 | 3940 | 4040 |
| HDT (66 psi) | ° C. | 169 | 206 | 211 | 206 | 214 | 215 |
| HDT (265 psi) | ° C. | 56 | 70 | 77 | 94 | 99 | 100 |

TABLE 3-continued

|  | Unit | E4 | E4 | E4 | E4 | E4 | E4 |
|---|---|---|---|---|---|---|---|
| Tensile Modulus | Mpa | 3590 | 4190 | 4430 | 4750 | 4810 | 4680 |
| Tensile Strength, Yield | Mpa | 61 | 68 | 68 | 70 | 68 | 69 |
| Tensile Strength, Break | Mpa | 55 | 67 | 68 | 70 | 68 | 69 |
| Tensile Elongation, Yield | % | 2.8 | 2.7 | 2.7 | 2.7 | 2.1 | 2.2 |
| Tensile Elongation, Break | % | 24 | 4 | 3 | 3 | 2 | 2 |
| Izod Impact, Unnotched, 23° C. | J/m | NB | 543 | 476 | 481 | 497 | NA |

NB: Not Broken
NA: Not Available

As can be seen from data in Table 3, increased crosslinking over time leads to increased heat deformation temperatures and tensile modulus, and a decrease in tensile elongation.

Examples 5-12

These examples show the effect of use of a crosslinking agent (beta-(3,4-epoxycyclohexyl)ethyltriethoxysilane) containing a terminal cycloaliphatic epoxy silane (Exs. 5-6) in combination with a trifunctional silane based on isocyanurate (Ex. 8). All properties except HDT were tested before crosslinking. HDT was tested before and after crosslinking at 200° C. for 10 hours. HDT is used as an indication to the extent of crosslinking during extrusion and in the thermal aging in the oven at 200° C.

Comparative Example 2 and Examples 13-14

Colorant Encapsulation

The components of C2 and E13 of Table 4 were extruded oil a 24 mm Prism Twin Screw Extruder with a vacuum vented mixing screw, at a barrel and die head temperature of 240 to 265° C. and 150 to 500 rpm screw speed. The extruder has one feeder and can be operated at a maximum rate of 60 lbs/hr. The extrudate was cooled through a water bath before pelletizing.

The pellets of Comparative Example C2 were dried for 3-4 hours at 120° C. in a forced air circulating oven before injection molding. Color plaques were injection molded at a thick-

TABLE 4

|  | Unit | E5 | E6 | E7 | E8 | E9 | E10 | E11 | E12 |
|---|---|---|---|---|---|---|---|---|---|
| PBT 195# | % | 47.68 | 47.66 | 47.64 | 46.68 | 47.64 | 46.64 | 45.64 | 46.16 |
| PBT 315# | % | 50 | 50 | 50 | 50 | 50 | 50 | 50 | 50 |
| CoatOSil 1770 | % | 2 | 2 | 2 | 2 | — | 2 | 2 | 2 |
| Silquest Y-11597 | % | — | — | — | 1 | 2 | 1 | 2 | 1.5 |
| Sn catalyst | % | — | 0.015 | 0.03 | — | 0.03 | 0.03 | 0.03 | 0.015 |
| I-1010 | % | 0.05 | 0.05 | 0.05 | 0.05 | 0.05 | 0.05 | 0.05 | 0.05 |
| Pigment Blue 29 | % | 0.25 | 0.25 | 0.25 | 0.25 | 0.25 | 0.25 | 0.25 | 0.25 |
| Sodium stearate | % | 0.025 | 0.025 | 0.025 | 0.025 | 0.025 | 0.025 | 0.025 | 0.025 |
| Property |  |  |  |  |  |  |  |  |  |
| HDT, 0.45 MPa, Before crosslinking | ° C. | 133 | 129 | 125 | 153 | 158 | 150 | 154 | 147 |
| HDT, 0.45 Mpa, After crosslinking | ° C. | 204 | 203 | 204 | 205 | 214 | 213 | 216 | 210 |
| Flexural Modulus | MPa | 2238 | 2177 | 2150 | 2294 | 2574 | 2437 | 2559 | 2337 |
| Tensile Modulus, 50 mm/min | MPa | 2413 | 2371 | 2310 | 2341 | 2674 | 2558 | 2595 | 2286 |
| Strain at Break** | % | 136 | 104 | 78 | 41 | 28 | 21 | 24 | 31 |
| Strain at Break - Std | % | 63 | 36 | 32 | 16 | 17 | 2 | 2 | 6 |
| INI, 23° C., Initial | kJ/m² | 5 | 5 | 5 | 5 | 5 | 5 | 5 | 5 |
| Flexural Strength* | MPa | 75 | 74 | 73 | 74 | 86 | 78 | 79 | 74 |
| Stress at Yield* | MPa | 52 | 52 | 53 | 52 | 56 | 54 | 52 | 49 |
| Stress at Break* | MPa | 34 | 32 | 30 | 37 | 40 | 43 | 42 | 37 |
| Strain at Yield* | % | 4 | 5 | 8 | 6 | 3 | 3 | 3 | 4 |

*Average value
milled

As can be seen from the data in Table 4, the presence of catalyst has no effect when an epoxy silane crosslinking agent is used (Example 5 vs. Exs. 6 and 7).

However, comparison of Example 5 with Examples E8 to E12 shows that use of a trifunctional silane either alone or in combination with epoxy silane and catalyst increases the HDT before and after crosslinking, indicating an increase in crosslink density with trifunctional silane. Such combinations can be used to tune the extent of crosslinking during the extrusion depending on the requirement. Moreover, tensile elongation, strain at break decreases with use of trifunctional silane indicating an increase in crosslink density. Use of multifunctional silanes can also result in crosslinked networks in PBT and hence thermally stable networks.

ness of 0.100 inches (2.5 mm) on a van Dorn molding machine with a set temperature of about 240 to 265° C.

The pellets of Example E13 were crosslinked at 200° C. for five hours. The crosslinked pellets were ground to a powder with a large particle size distribution. The resulting powder was sieved to collect a range of particle size fractions. It was found that a range of 0.0555 to 0.0787 inches (1.41 to 2 mm) produced a desirable effect.

In Example E14, the components shown in table 4 were combined with the sieved crosslinked particles of Example E13 and the crosslinked particles and directly injection molded at the molding machine. The pellets were dried for 3 to 4 hours at 120° C. in a forced air circulating oven before injection molding. Color plaques were injection molded at a thickness of 0.100 inches (2.5 mm) on a van Dorn molding machine with a set temperature of approximately 240 to 265° C.

TABLE 5

| Formulation A | C2 | E13 | E14 |
|---|---|---|---|
| PBT 315 | 97.84 | 48.27 | 96.24 |
| PBT 195 | — | 40.547 | — |
| PBT 195 fines | — | 7.723 | — |
| CoatOSil 1770 | — | 2 | — |
| Sodium stearate | — | 0.02 | — |
| Wax | 0.2 | — | .2 |
| Pentaerythritol-tetrakis(3-(3,5-di-tert-butyl-4-hydroxy-phenyl-)propionate) | 0.06 | 0.05 | 0.06 |
| TiO$_2$ | 1.0 | 0.5 | 1.0 |
| PP | 0.9 | 0.89 | — |
| Crosslinked Formulation E13 particles | — | — | 2.5 |

The color plaques of Example C2 were illuminated under cool white fluorescent bulbs or a D65 source for one minute. The resulting long afterglow effect was visibly apparent as a uniform greenish color, i.e., the afterglow effect is limited to a uniform distribution of pigment particles with the entire surface area of the object having an afterglow effect.

The color plaques of Example E14 were illuminated under cool white fluorescent bulbs or a D65 source for one minute. Randomly dispersed phosphorescent crosslinked PBT particles appeared as discrete greenish speckles.

While the invention has been illustrated and described in typical embodiments, it is not intended to be limited to the details shown, since various modifications and substitutions are possible without departing from the spirit of the present invention. As such, modifications and equivalents of the invention herein disclosed may occur to persons skilled in the art using no more than routine experimentation, and all such modifications and equivalents are believed to be within the spirit and scope of the invention as defined by the following claims.

What is claimed is:

1. A polymer composition, comprising a polymer and particles of a composition comprising a thermally crosslinked reaction product of a polyester and from 0.1 to 10 wt % based on the weight of the polyester, of a carboxy-reactive material comprising a terminal epoxy group and a terminal silane group; and a compound of the formula

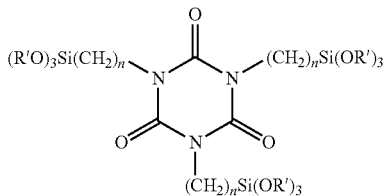

wherein each R' is independently the same or different $C_{1-6}$ alkyl group and each n is independently 1 to 6;
  wherein the particles have an average largest diameter of 0.5 to 1200 micrometers and are present in the polymer composition in an amount from 0.1 to 20 wt %, based on the total weight of the composition, effective to adjust the haze and/or clarity of the polymer.

2. The composition of claim 1, wherein the polyester is selected from the group consisting of poly(ethylene terephthalate), poly(1,4-butylene terephthalate), poly(ethylene naphthalate), poly(butylene naphthalate), (polytrimethylene terephthalate), poly(1,4-cyclohexylenedimethylene 1,4-cyclohexanedicarboxylate), poly(1,4-cyclohexylenedimethylene terephthalate), poly(cyclohexylenedimethylene-co-ethylene terephthalate), poly(butylene-co-poly(oxytetramethylene)terephthalate), poly(butylene-co-poly(oxyethylene)terephthalate), and combinations thereof.

3. The composition of claim 1, wherein the polyester is selected from the group consisting of poly(butylene terephthalate), poly(ethylene terephthalate), poly(trimethylene terephthalate), a combination of poly(ethylene naphthalate) and poly(butylene naphthalate), and combinations thereof.

4. The composition of claim 1, wherein the polyester is poly(butylene terephthalate).

5. The composition of claim 1, wherein the epoxy group is attached to a terminal cycloaliphatic ring system.

6. The composition of claim 5, wherein the epoxy silane has a general formula

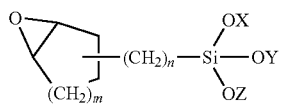

wherein m is an integer of 1-3, n is an integer of 1-6, and X, Y, and Z are each independently a C1-20 alkyl, a C4-10 cycloalkyl, a C7-16 alkylenephenyl, or a C7-16 phenylenealkyl.

7. The composition of claim 6, wherein m is 2, n is 1 or 2, and X, Y, and Z are the same and are a $C_{1-3}$ alkyl.

8. The composition of claim 1, wherein the epoxy silane is beta-(3,4-epoxycyclohexyl)ethyl triethoxysilane.

9. The composition of claim 1, wherein the thermally crosslinked reaction product has a gel content of at least 5 weight percent after extraction.

10. The composition of claim 1, wherein the composition of the particles has a heat deflection temperature at least 5° C. greater than the same composition when it is not crosslinked, wherein each heat deflection temperature is determined at 1.82 MPa in accordance with ASTM D648.

11. The composition of claim 1, wherein the composition of the particles further comprises an impact modifier, a filler, an antioxidant, a thermal stabilizer, a light stabilizer, an ultraviolet light absorbing additive, a quencher, a plasticizer, a lubricant, a mold release agent, an antistatic agent, a dye, pigment, a visual effect additive, a flame retardant, an antidrip agent, a radiation stabilizer, or a combination comprising at least one of the foregoing additives.

12. An article comprising the composition of claim 1.

13. The article of claim 12, wherein the article is injection molded, rotationally molded, compression molded, blow molded, gas assisted injection molded, extruded, or thermoformed.

14. The composition of claim 1, wherein the polyester is a poly(1,4-butylene terephthalate), and the carboxy-reactive material is beta-(3,4-epoxycyclohexyl)ethyl triethoxysilane.

15. A method for the manufacture of the thermally crosslinked reaction product of claim 1, comprising contacting the polyester and the carboxy-reactive material at a temperature and for a time sufficient to crosslink the polyester with the carboxy-reactive material.

16. The method of claim 15, wherein the contacting is at 140 to 220° C. for 2 to 20 hours.

17. The method of claim 15, wherein the crosslinking is in the presence of a catalyst.

18. The composition of claim 1, wherein the composition of the particles has a heat deflection temperature of at least 203° C., wherein the heat deflection temperature is determined at 0.45 MPa in accordance with ASTM D648.

19. The composition of claim 18, wherein the polyester is a poly(1,4-butylene terephthalate), and the carboxy-reactive material is beta-(3,4-epoxycyclohexyl)ethyl triethoxysilane.

20. A composition comprising a thermally crosslinked reaction product of a polyester and a combination of different carboxy-reactive materials, wherein the reaction product is in the form of particles having an average largest diameter of 10 to 100 micrometers, and wherein a first carboxy-reactive material is an epoxy silane comprising a terminal epoxy group and a terminal silane group and is present in an amount of 0.1 to 10 wt %, based on the weight of the polyester, and wherein the composition further comprises a second carboxy-reactive material that is a silane compound different than the first carboxy-reactive material.

21. The composition of claim 20, wherein the polyester is of the formula

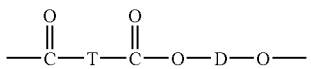

wherein each T is independently a divalent $C_{2-20}$ aliphatic group, $C_{5-20}$ cycloaliphatic group, or $C_{6-20}$ aromatic group derived from a dicarboxylic acid or a chemical equivalent thereof; and each D is independently a divalent $C_{2-20}$ alkylene group, $C_{6-20}$ alicyclic group, $C_{6-20}$ aromatic group, or poly($C_{2-6}$ oxyalkylene) group derived from a dihydroxy compound or a chemical equivalent thereof.

22. The composition of claim 20, wherein the polyester is selected from the group consisting of poly(ethylene terephthalate), poly(1,4-butylene terephthalate), poly(ethylene naphthalate), poly(butylene naphthalate), (polytrimethylene terephthalate), poly(1,4-cyclohexylenedimethylene 1,4-cyclohexanedicarboxylate), poly(1,4-cyclohexylenedimethylene terephthalate), poly(cyclohexylenedimethylene-co-ethylene terephthalate), poly(butylene-co-poly(oxytetramethylene)terephthalate), poly(butylene-co-poly(oxyethylene)terephthalate), and combinations thereof.

23. The composition of claim 20, wherein the polyester is selected from the group consisting of poly(butylene terephthalate), poly(ethylene terephthalate), poly(trimethylene terephthalate), a combination of poly(ethylene naphthalate) and poly(butylene naphthalate), and combinations thereof.

24. The composition of claim 20, wherein the polyester is poly(butylene terephthalate).

25. The composition of claim 20, wherein the composition has 10 to 320 milliequivalents epoxy group per 1.0 kg of the polyester.

26. The composition of claim 20, wherein the epoxy group in the first carboxy-reactive material is attached to a terminal cycloaliphatic ring system.

27. The composition of claim 26, wherein the first carboxy-reactive material is a epoxy silane that has a general formula

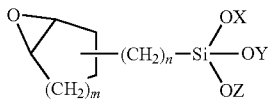

wherein m is an integer of 1-3, n is an integer of 1-6, and X, Y, and Z are each independently a C1-20 alkyl, a C4-10 cycloalkyl, a C7-16 alkylenephenyl, or a C7-16 phenylenealkyl.

28. The composition of claim 27, wherein m is 2, n is 1 or 2, and X, Y, and Z are the same and are a $C_{1-3}$ alkyl.

29. The composition of claim 20, wherein the epoxy silane is beta-(3,4-epoxycyclohexyl)ethyl triethoxysilane.

30. The composition of claim 20, wherein the second carboxy-reactive material has the following structure:

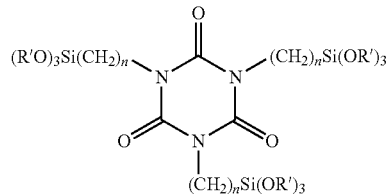

wherein each R' is independently the same or different $C_{1-6}$ alkyl group and each n is independently 1 to 6.

31. The composition of claim 20, wherein the polyester is a poly(1,4-butylene terephthalate), and the carboxy-reactive material is beta-(3,4-epoxycyclohexyl)ethyl triethoxysilane.

32. The composition of claim 20, further comprising an antioxidant, a thermal stabilizer, a light stabilizer, an ultraviolet light absorbing additive, a quencher, a plasticizer, a lubricant, a mold release agent, or a combination comprising at least one of the foregoing additives.

33. The composition of claim 20, wherein the thermally crosslinked reaction product has a gel content of at least 5 weight percent after extraction.

34. An article comprising the composition of claim 20.

35. The article of claim 34, wherein the article is injection molded or extruded.

36. A composition comprising a polymer and the particles of claim 20 in an amount effective to adjust the haze and/or clarity of the polymer.

37. A polymer composition comprising poly(butylene terephthalate) and particles comprising a thermally crosslinked reaction product of a polyester and a combination of different carboxy-reactive materials, a first carboxy-reactive material that is an epoxy silane comprising a terminal epoxy group and a terminal silane group, present in an amount of 0.1 to 10 wt %, based on the weight of the poly(butylene terephthalate), and a second carboxy-reactive material that is a silane compound different than the first carboxy-reactive material, wherein the particles have an average largest diameter of 0.5 to 1200 micrometers and wherein the amount of particles, effective to adjust the haze and/or clarity of the polymer composition, is from 0.001 to 20 wt %, based on the total weight of the polymer composition.

38. An article comprising the composition of claim 37.

39. A method for the manufacture of the thermally crosslinked polyester composition of claim 20, comprising:
contacting the polyester and the carboxy-reactive materials at a temperature and for a time sufficient to crosslink the polyester with the carboxy-reactive material; and
comminuting the crosslinked thermally crosslinked polyester composition to form the particles.

40. The method of claim 39, wherein the contacting is at 140 to 220° C. for 2 to 20 hours.

41. The method of claim 39, wherein the contacting is in the presence of a catalyst.

42. The method of claim 39, wherein the contacting is at 140 to 220° C. for 2 to 20 hours in the presence of a catalyst.

43. A composition comprising poly(butylene terephthalate)polymer and a thermally crosslinked reaction product of a polyester and a carboxy-reactive material, wherein the reaction product is in the form of particles having an average largest diameter of 0.5 to 1200 micrometers, wherein the particles are present in an amount, from 0.001 to 20 wt %, based on the total weight of the composition, effective to adjust the haze and/or clarity of the polymer.

44. An article comprising the composition of claim 43.

* * * * *